United States Patent
Yang et al.

(10) Patent No.: US 12,341,574 B2
(45) Date of Patent: Jun. 24, 2025

(54) INTELLIGENT PANEL REGULATION AND CONTROL METHOD, DEVICE, AND SYSTEM, INTELLIGENT PANEL, AND STORAGE MEDIUM

(71) Applicant: ZTE CORPORATION, Shenzhen (CN)

(72) Inventors: Jun Yang, Shenzhen (CN); Yijian Chen, Shenzhen (CN); Min Fang, Shenzhen (CN); Jianwu Dou, Shenzhen (CN); Zhaohua Lu, Shenzhen (CN); Liujun Hu, Shenzhen (CN); Wanchun Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 194 days.

(21) Appl. No.: 18/257,992

(22) PCT Filed: Dec. 10, 2021

(86) PCT No.: PCT/CN2021/136982
§ 371 (c)(1),
(2) Date: Jun. 23, 2023

(87) PCT Pub. No.: WO2022/127697
PCT Pub. Date: Jun. 23, 2022

(65) Prior Publication Data
US 2024/0056128 A1   Feb. 15, 2024

(30) Foreign Application Priority Data

Dec. 16, 2020  (CN) .......................... 202011487733.4

(51) Int. Cl.
H04B 7/04   (2017.01)
H04B 7/06   (2006.01)

(52) U.S. Cl.
CPC ....... *H04B 7/04013* (2023.05); *H04B 7/0617* (2013.01); *H04B 7/0634* (2013.01)

(58) Field of Classification Search
CPC . H04B 7/04013; H04B 7/0617; H04B 7/0634
See application file for complete search history.

(56) References Cited

U.S. PATENT DOCUMENTS

| 7,307,589 B1 | 12/2007 | Gregoire et al. |
| 2016/0204913 A1 | 7/2016 | Agee et al. |

(Continued)

FOREIGN PATENT DOCUMENTS

| CN | 108511916 A | 9/2018 |
| CN | 108511922 A | 9/2018 |

(Continued)

OTHER PUBLICATIONS

International Search Report in Application No. PCT/CN2021/136982, dated Mar. 1, 2022, 6 pages, including translation.

(Continued)

*Primary Examiner* — Rahel Guarino
(74) *Attorney, Agent, or Firm* — Morgan, Lewis & Bockius LLP

(57) ABSTRACT

Provided are an intelligent metasurface manipulation method, apparatus, and system, an intelligent metasurface, and a storage medium. The intelligent metasurface manipulation method includes determining channel information and beam manipulation information; determining a manipulation parameter to be optimized in a preset target function according to the channel information and the beam manipulation information; determining a target manipulation state of each electromagnetic unit on an intelligent metasurface according to the manipulation parameter to be optimized; and adjusting a current state of each electromagnetic unit to the target manipulation state.

20 Claims, 5 Drawing Sheets

(56) References Cited

U.S. PATENT DOCUMENTS

| | | | |
|---|---|---|---|
| 2019/0044549 | A1 | 2/2019 | Pillai et al. |
| 2020/0358205 | A1 | 11/2020 | Sun et al. |
| 2021/0288698 | A1 | 9/2021 | Chen et al. |
| 2022/0014935 | A1* | 1/2022 | Haija .................. H04L 5/0048 |

FOREIGN PATENT DOCUMENTS

| | | |
|---|---|---|
| CN | 108594221 A | 9/2018 |
| CN | 109270499 A | 1/2019 |
| CN | 109391296 A | 2/2019 |
| CN | 109522587 A | 3/2019 |
| CN | 109644347 A | 4/2019 |
| CN | 110278017 A | 9/2019 |
| CN | 110365616 A | 9/2019 |
| CN | 110336575 A | 10/2019 |
| CN | 110830209 A | 2/2020 |
| CN | 110920687 A | 3/2020 |
| CN | 111010219 A | 4/2020 |
| CN | 111131096 A | 5/2020 |
| CN | 111181615 A | 5/2020 |
| CN | 111355520 A | 6/2020 |
| CN | 111386734 A | 7/2020 |
| CN | 111416646 A | 7/2020 |
| CN | 111447618 A | 7/2020 |
| CN | 111628806 A | 9/2020 |
| CN | 111757336 A | 10/2020 |
| CN | 111787558 A | 10/2020 |
| CN | 111817755 A | 10/2020 |
| CN | 111817768 A | 10/2020 |
| CN | 111818452 A | 10/2020 |
| CN | 111866726 A | 10/2020 |
| CN | 111867054 A | 10/2020 |
| CN | 111901014 A | 11/2020 |
| CN | 111930052 A | 11/2020 |
| CN | 111930053 A | 11/2020 |
| CN | 112313909 A | 2/2021 |
| CN | 112735111 A | 4/2021 |
| EP | 2259617 A1 | 12/2010 |
| EP | 3439107 A1 | 2/2019 |
| JP | 2019024148 A | 2/2019 |
| JP | 2021517398 A | 7/2021 |
| JP | 2023532074 A | 7/2023 |
| WO | WO2019180831 A1 | 9/2019 |

OTHER PUBLICATIONS

Chinese Office Action in Application No. 202011487733.4 dated Sep. 16, 2021, 13 pages including translation.

Ozeki, et al., "Beam Direction Control Using Meta-surface Loaded with Diodes for IoT", Progress in Electromagnetics Research Symposium, PIERS. 2018, p. 94.

Office Action in Japanese Application No. 2023-536919 dated Jun. 18, 2024, 17 pages including translation.

* cited by examiner

INTELLIGENT PANEL REGULATION AND CONTROL METHOD, DEVICE, AND SYSTEM, INTELLIGENT PANEL, AND STORAGE MEDIUM

TECHNICAL FIELD

The present application relates to the communication field, for example, an intelligent metasurface manipulation method, apparatus, and system, an intelligent metasurface, and a storage medium.

BACKGROUND

The commercialization of the fifth-generation mobile communication technology networks (5G) drives the development of other industries and applications, which in turn place higher demands on the communication networks, including ultra-large bandwidth, ultra-low delay, ultra-dense connectivity, and ultra-high reliability. Therefore, it becomes especially important to intelligently transform the wireless electromagnetic environment between a transmitting end and a receiving end. An intelligent metasurface plays a key role in transforming the wireless electromagnetic environment between the transmitting end and the receiving end. The research on beam manipulation of the intelligent metasurface is mainly focused on a single-user scenario. However, in practical application scenarios, one intelligent metasurface may need to serve multiple terminal users at the same time. Therefore, how to achieve signal enhancement and interference suppression in a multi-user scenario is an urgent problem to be solved.

SUMMARY

Embodiments of the present application provide an intelligent metasurface manipulation method, apparatus, and system, an intelligent metasurface, and a storage medium, achieving signal enhancement and interference suppression in a multi-user scenario.

An embodiment of the present application provides an intelligent metasurface manipulation method. The method includes the following.

Channel information and beam manipulation information are determined; a manipulation parameter to be optimized in a preset target function is determined according to the channel information and the beam manipulation information; a target manipulation state of each electromagnetic unit on an intelligent metasurface is determined according to the manipulation parameter to be optimized; and a current state of the electromagnetic unit is adjusted to the target manipulation state.

An embodiment of the present application provides an intelligent metasurface manipulation apparatus. The apparatus includes a first determination module, a second determination module, a third determination module, and an adjuster.

The first determination module is configured to determine channel information and beam manipulation information. The second determination module is configured to determine a manipulation parameter to be optimized in a preset target function according to the channel information and the beam manipulation information. The third determination module is configured to determine a target manipulation state of each electromagnetic unit on an intelligent metasurface according to the manipulation parameter to be optimized. The adjuster is configured to adjust a current state of the electromagnetic unit to the target manipulation state.

An embodiment of the present application provides an intelligent metasurface. The intelligent metasurface includes a communication module, a memory, and one or more processors. The communication module is configured to perform communication interaction with a first communication node and a second communication node; the memory is configured to store one or more programs; and the one or more programs, when executed by the one or more processors, cause the one or more processors to perform the intelligent metasurface manipulation method in any one of the preceding embodiments.

An embodiment of the present application provides an intelligent metasurface manipulation system. The intelligent metasurface manipulation system at least includes one first communication node, at least one second communication node, and at least one intelligent metasurface; where the first communication node communicates with the intelligent metasurface in a wired manner or a wireless manner, the second communication node communicates with the intelligent metasurface in the wireless manner, one first communication node, one intelligent metasurface, and the at least one second communication node form one beam optimization manipulation group, and the beam optimization manipulation group is configured to optimize, regulate, and control a wireless electromagnetic wave according to the intelligent metasurface manipulation method in any one of the preceding embodiments.

An embodiment of the present application provides a storage medium storing a computer program, where the computer program, when executed by a processor, causes the processor to perform the intelligent metasurface manipulation method in any one of the preceding embodiments.

DETAILED DESCRIPTION

Embodiments of the present application are described below in conjunction with drawings. The present application is described below in conjunction with the embodiments and drawings, and examples are given only for explaining the present application.

Figure 1:
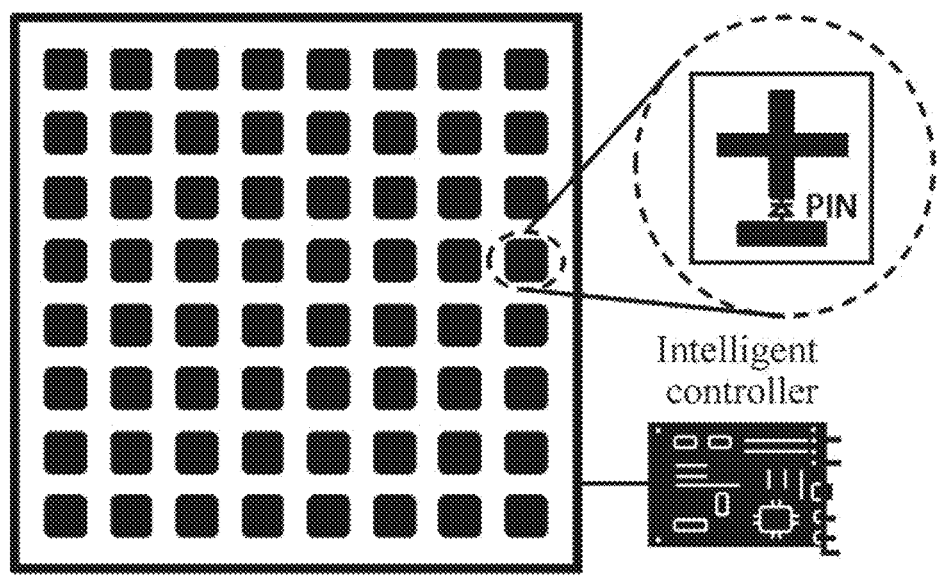
FIG. 1 is a structural diagram of an intelligent metasurface according to an embodiment of the present application.

An intelligent metasurface is a two-dimensional planar array formed by a large number of passive electromagnetic cells, where the electromagnetic cells are arranged according to a certain rule and have a negligible thickness. Since these specially designed electromagnetic cells exhibit physical properties not found in natural materials, the two-dimensional array formed by these artificial electromagnetic cells is called a metasurface. Each electromagnetic unit is made of metal or dielectric material of a specific shape and is connected to an electronic component, and the electronic component is controlled by an intelligent controller on the panel so that the electromagnetic properties (for example, average permeability and average permittivity) of the electromagnetic unit can be adjusted independently. The electromagnetic properties of the electromagnetic unit are manipulated so that an electromagnetic signal impinging to the surface of the electromagnetic unit can be reflected or transmitted with different amplitudes, phases, and polarization directions, and a virtual direct path can be constructed between a base station and a user terminal to achieve the purpose of intelligently manipulating the electromagnetic environment in space. FIG. 1 is a structural diagram of an intelligent metasurface according to an embodiment of the present application. As shown in FIG. 1, the intelligent metasurface sends an independent control instruction to each electromagnetic unit simultaneously through the intelligent controller so that when the electromagnetic wave impinging to the surface of the electromagnetic units are reflected or transmitted, the amplitude, phase, or polarization direction can be changed correspondingly. In such way, the electromagnetic waves reflected or transmitted by all electromagnetic units are superimposed in space to generate the beamforming effect and finally received by a specific terminal device. The intelligent metasurface is introduced in the wireless communication system so that the expansion and efficient use of space resources can be achieved, which is conducive to enhancing the channel capacity of the wireless communication system, improving the reliability and coverage of communications, reducing transmission power consumption, and saving costs.

Figure 2:
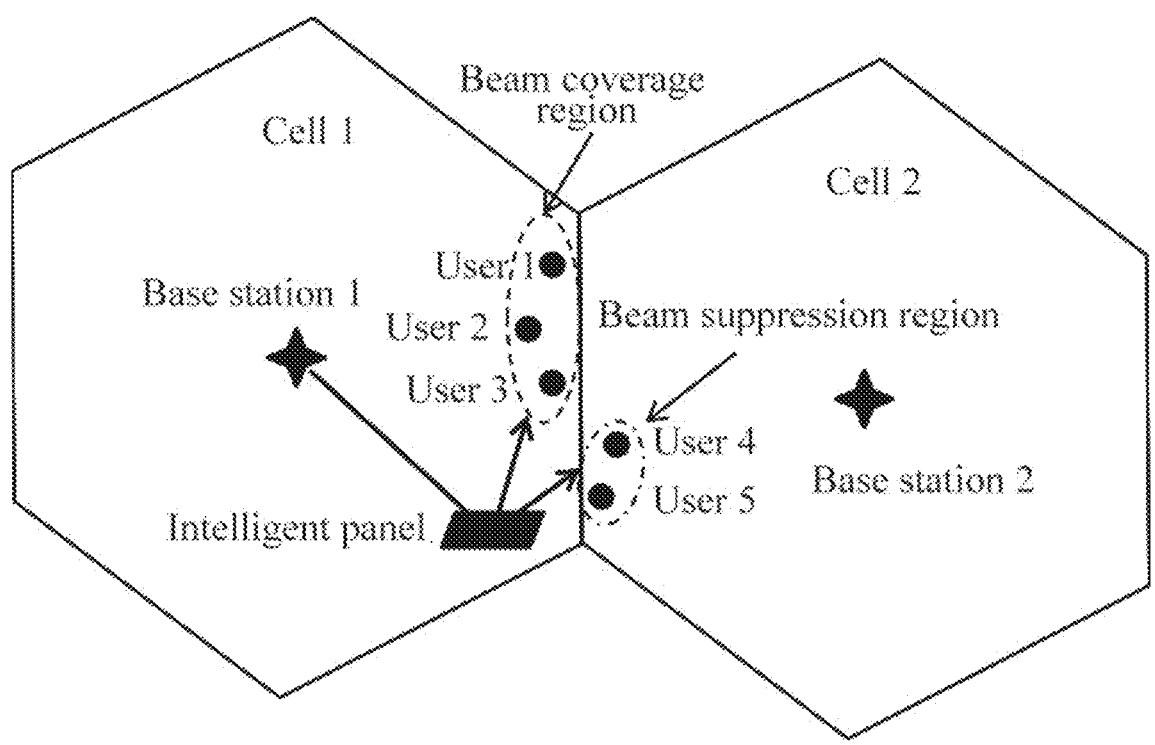
FIG. 2 is a schematic diagram of a wireless communication system assisted by an intelligent metasurface according to an embodiment of the present application.

In practical application scenarios, since one intelligent metasurface may need to serve multiple terminal users at the same time, the signal emitted by the base station should be enhanced in multiple user directions at the same time after manipulation by the intelligent metasurface, that is, after reaching the intelligent metasurface, the signal emitted by the base station is divided into multiple relatively strong beams separately directed to different users. On the other hand, the multiple beams generated after manipulation by the intelligent metasurface can carry strong sidelobes, and the sidelobes may interfere with user signals of neighboring cells. At this time, the sidelobes in these directions need to be suppressed, so as to reduce the interference. FIG. 2 is a schematic diagram of a wireless communication system assisted by an intelligent metasurface according to an embodiment of the present application. As shown in FIG. 2, the intelligent metasurface located at the edge of the cell needs to implement beam coverage and beam suppression to serve users 1, 2, and 3 in this cell (cell 1), while trying to avoid interfering with users 4 and 5 in the neighboring cell (cell 2). The research on beam manipulation of the intelligent metasurface mainly focuses on a single-user scenario and pays less attention to signal enhancement and interference suppression in a multi-user situation.

In view of this, an embodiment of the present application proposes an intelligent metasurface manipulation method, achieving signal enhancement and signal interference suppression in a multi-user scenario.

Figure 3:
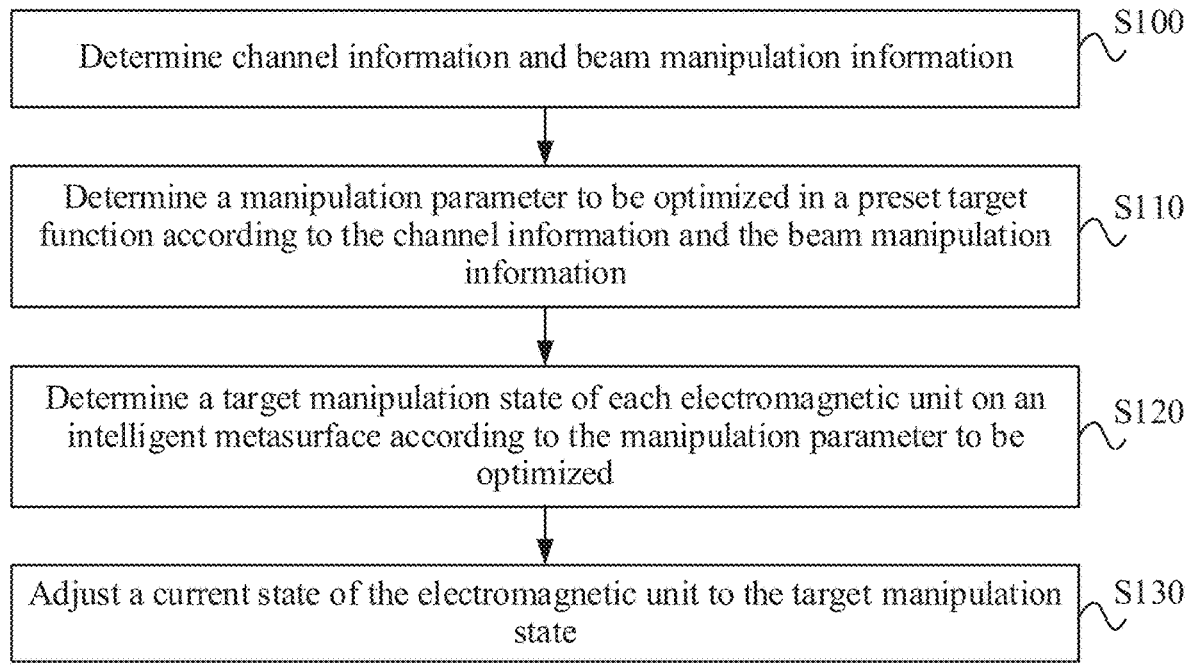
FIG. 3 is a flowchart of an intelligent metasurface manipulation method according to an embodiment of the present application.

In an embodiment, FIG. 3 is a flowchart of an intelligent metasurface manipulation method according to an embodiment of the present application. This embodiment may be performed by the intelligent metasurface or a first communication node. The first communication node refers to a network side (for example, a wireless base station), and a second communication node refers to a terminal side (for example, user equipment or a wireless terminal). In an embodiment, the case where the intelligent metasurface performs the solutions of this embodiment is used as an example for the description of the manipulation process of the intelligent metasurface.

As shown in FIG. 3, this embodiment includes S100 to S130.

In S100, channel information and beam manipulation information are determined.

In an embodiment, the step of determining the channel information and the beam manipulation information includes one of the following.

The channel information and the beam manipulation information sent by a first communication node or a second communication node are received; or the channel information and the position of the second communication node are calculated according to a received protocol message and the beam manipulation information is determined according to the position of the second communication node.

In an embodiment, in the case where the intelligent metasurface receives the channel information and the beam manipulation information sent by the first communication node or the second communication node, a communication connection is established between the intelligent metasurface and the first communication node or the second communication node, the channel information and the position of the second communication node are calculated through the first communication node or the second communication node according to the protocol message, the beam manipulation information is determined according to the position of the second communication node, and then the channel information and the beam manipulation information are sent to the intelligent metasurface. In an embodiment, the intelligent metasurface can actively measure and determine the channel information and the beam manipulation information, that is, an active measurement unit is provided in the intelligent metasurface and can send, receive, and process a standard protocol message, and the intelligent metasurface actively measures the channel information and the position of the second communication node according to the received protocol message and determines the beam manipulation information according to the measured position of the second communication node. For the implementation of calculating the channel information and the position of the second communication node according to the received protocol message, reference may be made to the related art, and the details are not repeated here.

In S110, a manipulation parameter to be optimized in a preset target function is determined according to the channel information and the beam manipulation information.

In an embodiment, the channel information is used for representing the state of a channel between the wireless base station and the intelligent metasurface and the state of a channel between the intelligent metasurface and the wireless terminal. For example, the channel information may include the gain, phase change, and interference level of a wireless signal after propagation through the channel, the beam manipulation information refers to a beam pointing direction, and the beam manipulation information at least includes the information about a beam coverage region and may also include the information about a beam suppression region. In an embodiment, the beam coverage region and the beam suppression region may be determined by the position of the communication node of first type and the position of the communication node of second type that are detected in real time or pre-configured. In an embodiment, in the case where the intelligent metasurface operates independently and the measurement unit is not provided in the intelligent metasurface, that is, in the case where no communication connection is performed between the intelligent metasurface and the first communication node and the measurement unit is not included in the intelligent metasurface, the position of the communication node of first type and the position of the communication node of second type may be pre-configured and stored in a memory of the intelligent metasurface so that according to the position of the communication node of first type and the position of the communication node of second type that are pre-stored, the intelligent metasurface determines the beam coverage region and the beam suppression region, that is, the beam pointing direction of the intelligent metasurface is determined. In an embodiment, in the case where the measurement unit is provided in the intelligent metasurface or the communication connection is established between the intelligent metasurface and the first communication node, the channel information and the beam manipulation information may be measured by the measurement unit in the intelligent metasurface or the first communication node.

In an embodiment, the preset target function is determined by the signal strength received by the communication node of the first type, the signal strength received by the communication node of the second type, the average signal strength received by the communication nodes of first type, and the average signal strength received by the communication nodes of second type. The communication node of first type refers to the second communication node that the intelligent metasurface needs to serve, and the communication node of second type is the second communication node with which the intelligent metasurface needs to be prevented from interfering. The second communication node refers to the user equipment (which may also be abbreviated as a user). As shown in FIG. 2, second communication nodes that the intelligent metasurface needs to serve include user 1, user 2, and user 3, and second communication nodes with which the intelligent metasurface needs to be prevented from interfering include user 4 and user 5. It is to be understood that user 1, user 2, and user 3 are the communication nodes of first type, and user 4 and user 5 are the communication nodes of second type.

In an embodiment, the manipulation parameter to be optimized refers to a corresponding parameter to minimize the preset target function. For example, the manipulation parameter to be optimized may include the amplitude and phase. In an embodiment, the preset target function is constructed using the signal strength received by the communication node of first type, the signal strength received by the communication node of second type, the average signal strength received by the communication nodes of first type, and the average signal strength received by the communication nodes of second type, and then the channel information and the beam manipulation information are adjusted until the preset target function achieves the minimum value so that the corresponding manipulation parameter to be optimized is determined.

In S120, a target manipulation state of each electromagnetic unit on an intelligent metasurface is determined according to the manipulation parameter to be optimized.

In S130, a current state of the electromagnetic unit is adjusted to the target manipulation state.

In an embodiment, the target manipulation state refers to a state to be achieved by the electromagnetic unit. In an embodiment, after the target manipulation state to be achieved by each electromagnetic unit is determined according to the manipulation parameter to be optimized, the electronic component in the electromagnetic unit is manipulated so that the current state of the electromagnetic unit is adjusted to the target manipulation state.

In an embodiment, after the wireless electromagnetic signal emitted by the first communication node reaches the intelligent metasurface, the intelligent metasurface adjusts the state of the electronic component in each electromagnetic unit according to the manipulation parameter to be optimized so that the electromagnetic unit reaches the target manipulation state, allowing more signal energy to converge to the second communication node that the intelligent metasurface needs to serve and achieving an improved signal-to-noise ratio and coverage, that is, enhancing the received signal of the second communication node that needs to be served and suppressing the interference signal of the second communication node that needs to be circumvented.

In an embodiment, in the case where the intelligent metasurface manipulation method is performed by the first communication node, the first communication node calculates the channel information and the position of the second communication node according to the received protocol message, determines the beam manipulation information according to the position of the second communication node, calculates the manipulation parameter to be optimized in the preset target function according to the channel information and the beam manipulation information, determines the target manipulation state of each electromagnetic unit on the intelligent metasurface according to the manipulation parameter to be optimized, generates an manipulation instruction corresponding to the target manipulation state, and sends the manipulation instruction to the intelligent metasurface so that the intelligent metasurface adjusts the current state of the electromagnetic unit to the target manipulation state according to the manipulation instruction.

In an embodiment, the channel information at least includes a channel matrix between the first communication node and the intelligent metasurface and a channel matrix between the intelligent metasurface and the second communication node.

In an embodiment, the beam manipulation information at least includes information about the beam coverage region, where the beam coverage region is a region where the wireless electromagnetic signal needs to be enhanced, at least one beam coverage region exists, and the beam coverage region is a point or a geometric area in space.

In an embodiment, the beam manipulation information further includes information about the beam suppression region, where the beam coverage region is a region where the wireless electromagnetic signal needs to be enhanced, the beam suppression region is a region where the wireless electromagnetic signal needs to be weakened, and the beam suppression region is a point or a geometric area in space.

In an embodiment, the beam coverage region refers to a region where the second communication node that the intelligent metasurface needs to serve is located, and the beam suppression region refers to a region where the second communication node with which the intelligent metasurface needs to be prevented from interfering is located. At least one beam coverage region exists, and each of the beam coverage region and the beam suppression region is a point or a geometric area in space. It is to be understood that one or more beam coverage regions may exist, and one or more beam suppression regions may exist. It is to be understood that in the case where no second communication node with which the intelligent metasurface needs to be prevented from interfering exists, the beam manipulation information may include only the information about the beam coverage region.

In an embodiment, the beam manipulation information is determined by the positions of all the communication node of first types and the positions of all the communication node of second types, where the communication node of first type is the second communication node that the intelligent metasurface needs to serve, the communication node of second type is the second communication node with which the intelligent metasurface needs to be prevented from interfering, the positions of the communication nodes of the first type form the beam coverage region, and the positions of the communication nodes of the second type form the beam suppression regions.

In an embodiment, a manner of determining the number of the communication nodes of first type, the number of the communication nodes of second type, the positions of the communication nodes of first type, and the positions of the communication nodes of second type includes one of the following: pre-configured or real-time measurement. In an embodiment, in the case where the intelligent metasurface operates independently and the measurement unit is not provided in the intelligent metasurface, that is, in the case where no communication connection is performed between the intelligent metasurface and the first communication node and the measurement unit is not included in the intelligent metasurface, the positions and number of the communication nodes of the first type and the positions and number of the communication nodes of the second type may be pre-configured. In an embodiment, in the case where the measurement unit is provided in the intelligent metasurface or the communication connection is established between the intelligent metasurface and the first communication node, the positions and number of the communication nodes of first type and the positions and number of the communication nodes of second type may be measured by the measurement unit in the intelligent metasurface or the first communication node.

In an embodiment, the manipulation parameter to be optimized in the preset target function is determined using a genetic algorithm or a gradient descent algorithm.

In an embodiment, the intelligent metasurface is formed by an electromagnetic unit array, where the electromagnetic unit array is formed by the same or different types of electromagnetic units and includes one of the following: a planar array or a curved array.

In an embodiment, the electromagnetic unit is made of one of the following materials: metal, dielectric material, or liquid crystal material. The size of the electromagnetic unit is of sub-wavelength, and the electromagnetic unit is configured to manipulate an electromagnetic wave impinging to the surface of the electromagnetic unit. An electromagnetic property to be manipulated on the electromagnetic unit includes one of the following: electromagnetic wave amplitude, phase, or polarization direction. The electromagnetic unit includes one of the following adjustable electronic components: resistors, capacitors, diodes, varactor diodes, or triodes.

In an embodiment, the case where the first communication node is the base station and the second communication node is the user equipment (which may also be called the terminal device) is used as an example for the description of the structure and implementation of the intelligent metasurface. In an embodiment, the intelligent metasurface may be used for wireless electromagnetic beam manipulation. The intelligent metasurface may be formed by the reflection or transmission array formed by artificial electromagnetic units, the intelligent controller controls each electromagnetic unit, and under the control instruction, the electromagnetic unit generates a specific electromagnetic response to the electromagnetic wave impinging to the surface of the electromagnetic unit to manipulate the incident electromagnetic wave so that after the reflection or transmission on the surface of the intelligent metasurface, the electromagnetic wave changes the amplitude, phase, and polarization direction. Therefore, the wireless electromagnetic signal emitted by the wireless base station is manipulated after reaching the intelligent metasurface so that more signal energy converges to the terminal device that the intelligent metasurface serves, achieving an improved signal-to-noise ratio and coverage.

In an embodiment, the features of the intelligent metasurface include an array of electromagnetic units with an electromagnetic manipulation capability; capable of receiving or measuring the channel information and the beam manipulation information; and adjusting the manipulation state of the electromagnetic units according to the channel information and the beam manipulation information.

In an embodiment, the case where the intelligent metasurface is formed by an array of electromagnetic units with the electromagnetic manipulation capability is described. The electromagnetic unit is made of metal, dielectric material, or liquid crystal material with a negligible thickness. The size of each electromagnetic unit is of sub-wavelength, and thus the electromagnetic unit has the unique capability of manipulating the incident electromagnetic wave, including the manipulation of electromagnetic properties such as the amplitude, phase, and polarization direction of the electromagnetic wave. The electromagnetic unit may also include the adjustable electronic component, such as the resistor, the capacitor, the diode, the varactor diode, or the triode. The state of the electronic component is controlled so that the electromagnetic unit can dynamically adjust the characteristics of the manipulation of the incident electromagnetic wave. In the case where the electromagnetic unit does not include the adjustable electronic component, the electromagnetic unit has fixed electromagnetic manipulation characteristics.

The intelligent metasurface may be formed by the same or different types of electromagnetic units. The different types of electromagnetic units have different physical structures or are connected to different electronic components, so the different types of electromagnetic units have different electromagnetic response characteristics. The same or different types of electromagnetic units are arranged together according to a certain rule to form an electromagnetic unit array, thereby forming the intelligent metasurface with a spatial electromagnetic manipulation capability. The electromagnetic unit array may be a planar array, such as a rectangular array and a toroidal array or may be a curved array, such as a spherical array, a parabolic array, and a hyperbolic array. The intelligent metasurface may be deployed outdoors or indoors as needed. In an outdoor scenario, the intelligent metasurface may be mounted on a building facade or at other positions convenient for the intelligent metasurface to be fixed. In an indoor scenario, the intelligent metasurface may be mounted on the ceiling or the wall or at other positions convenient for the intelligent metasurface to be fixed.

In an embodiment, the case where the intelligent metasurface can receive or measure the channel information and the beam manipulation information is described. In an embodiment, the intelligent metasurface may communicate with the base station in the wired or wireless manner. In one case, the intelligent metasurface can passively receive the channel information and the beam manipulation information sent by the base station or terminal device. In another case, the intelligent metasurface can actively measure the channel information and the beam manipulation information. In the case where the intelligent metasurface actively measures the channel information and the beam manipulation information, the active measurement unit that can send, receive, and process the standard protocol message is required on the intelligent metasurface, so as to calculate the channel information and terminal position information and determine the beam manipulation information according to the terminal position information. In an embodiment, the intelligent metasurface may also work independently without communicating with the base station.

In an embodiment, after the intelligent metasurface acquires the channel information and the beam manipulation information, the current manipulation state of the electromagnetic unit is adjusted according to the channel information and the beam manipulation information. In an embodiment, the intelligent metasurface can actively or passively acquire the channel information and the beam manipulation information. In an embodiment, the beam manipulation information includes the information about the beam coverage region and the information about the beam suppression region. The beam coverage region refers to a region where the wireless electromagnetic signal needs to be enhanced, usually to achieve available signal coverage and signal quality improvement in the region, and one or more beam coverage regions may exist. The beam suppression region refers to a region where the wireless electromagnetic signal needs to be weakened, usually to reduce the impact of the interference signal on the terminal device in the region, and zero, one, or more beam suppression regions may exist. According to the beam manipulation information, the electromagnetic waves reflected or transmitted by the intelligent metasurface need to converge as many as possible to the beam coverage region and as few as possible to the beam suppression region.

According to the channel information and the beam manipulation information received by the intelligent metasurface, the manipulation state of each electromagnetic unit on the intelligent metasurface is determined in the electromagnetic panel state manipulation method in the embodiment of the present application. Manipulation states of the electromagnetic unit are in one-to-one correspondence with output levels of a control circuit of the intelligent metasurface. The output level of the control circuit of the intelligent metasurface is adjusted according to the determined manipulation state so that the state of the electronic component on the electromagnetic unit changes, thereby adjusting the manipulation state of the electromagnetic unit and finally achieving the electromagnetic beam manipulation target. In the case where the intelligent metasurface operates independently, the channel information and the beam manipulation information acquired in other methods need to be written into a memory system of the intelligent metasurface before installation and deployment, and the intelligent metasurface completes the optimization of the manipulation state according to the written information. After the installation and deployment are completed, the channel information and the beam manipulation information in the system memory of the intelligent metasurface may also be updated again, triggering the intelligent metasurface to implement manipulation optimization again.

Figure 4:
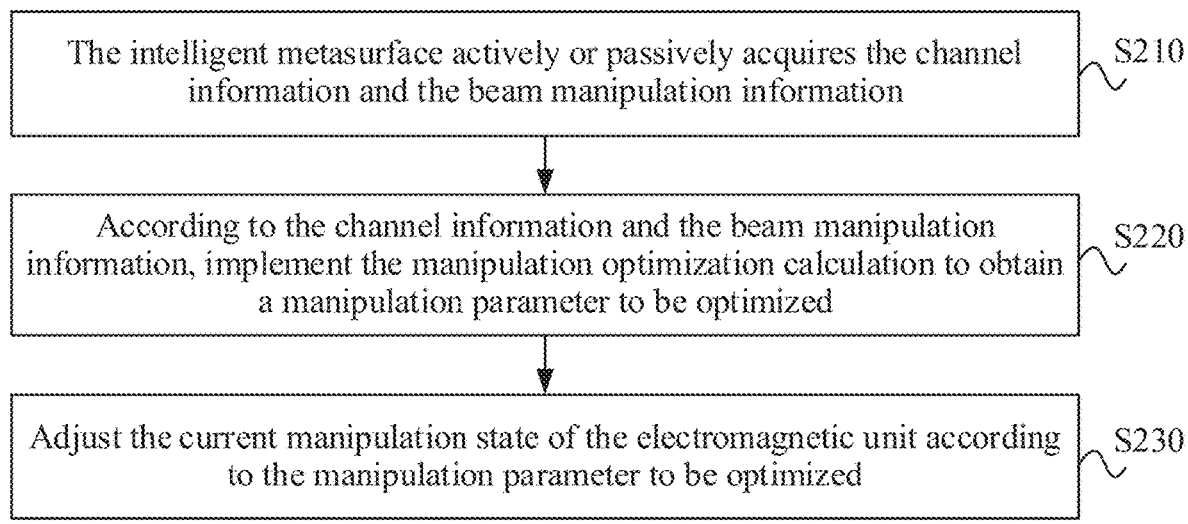
FIG. 4 is a flowchart of another intelligent metasurface manipulation method according to an embodiment of the present application.

In an embodiment, FIG. 4 is a flowchart of another intelligent metasurface manipulation method according to an embodiment of the present application. The method in this embodiment is used for pre-coding optimization of the manipulation of a single electromagnetic parameter (one of the amplitude or phase). The optimization of the manipulation of the electromagnetic state of the intelligent metasurface is to determine the required manipulation state of each electromagnetic unit on the intelligent metasurface in the case where the beam coverage region and the beam suppression region are given so that the electromagnetic waves transmitted or reflected by the intelligent metasurface converge as many as possible to the beam coverage region and as few as possible to the beam suppression region. For example, on the intelligent metasurface with a phase manipulation capability, how much the phase of the incident electromagnetic wave is changed by each electromagnetic unit on the intelligent metasurface to satisfy two constraints of the beam coverage region and the beam suppression region needs to be determined. On the intelligent metasurface with an amplitude manipulation capability, how much the amplitude of the incident electromagnetic wave is changed by each electromagnetic unit on the panel to satisfy the constraint needs to be determined. As shown in FIG. 4, this embodiment includes S210 to S230.

In S210, the intelligent metasurface actively or passively acquires the channel information and the beam manipulation information.

In one case, the intelligent metasurface is provided with the active measurement unit that can establish a connection with the base station and the terminal device and obtain the required channel information and beam manipulation information by sending, receiving, and processing the standard protocol message. The channel information at least includes a channel matrix (denoted as $H_1$) between the base station and the intelligent metasurface and a channel matrix (denoted as $H_2$) between the intelligent metasurface and the terminal device. Assuming that the base station has N transmit antennas, the intelligent metasurface has M electromagnetic units, and the intelligent metasurface serves $K_1$ terminal devices and needs to be prevented from interfering with $K_2$ terminal devices, $H_1$ is a complex matrix with a dimension of M*N and $H_2$ is a complex matrix with a dimension of $(K_1+K_2)$*M. The (m, n)-th element of one channel matrix H may be written as $h_{mn}=|h_{mn}|e^{j\theta_{mn}}$, where the modulus of the element $h_{mn}$, which is denoted as $|h_{mn}|$, represents the gain of the signal after passing through the corresponding channel, and the argument $\theta_{mn}$ denotes the variation in phase of the signal after passing through the corresponding channel. The beam manipulation information is determined by the positions of the $K_1$ terminal devices that need to be served and the $K_2$ terminal devices that need to avoid interference, and the beam coverage region and the beam suppression region are calculated according to the positions of these terminals. The beam coverage region and the beam suppression region may also be artificially specified as needed, rather than determined by the positions of the terminal devices in a current intelligent metasurface service region.

In another case, the intelligent metasurface passively acquires the channel information and the beam manipulation information from the base station or the terminal device, where the connection between the intelligent metasurface and the base station may be wired or wireless transmission, and the connection between the intelligent metasurface and the terminal device is wireless transmission.

In addition, in the case where the intelligent metasurface operates independently, the channel information and the beam manipulation information need to be written to the system memory of the intelligent metasurface in advance, and the intelligent metasurface completes the subsequent optimization according to the written information. After the installation and deployment are completed, the channel information and the beam manipulation information in the system memory may also be updated again and the next operation is triggered.

In S220, according to the channel information and the beam manipulation information, the manipulation optimization calculation is implemented, so as to obtain an optimization parameter to be manipulated.

According to the channel information obtained in S210, the preset target function may be constructed below.

$$f(x) = -w_1 \sum_{i=1}^{K_1} P_{Rx,i}(x) + \qquad (1)$$

$$w_2 \sum_{i=1}^{K_1} \left| P_{Rx,i}(x) - \overline{P_{Rx}(x)} \right| + w_3 \sum_{j=1}^{K_2} P_{Ix,j}(x) + w_4 \sum_{j=1}^{K_2} \left| P_{Ix,j}(x) - \overline{P_{Ix}(x)} \right|$$

In function (1), $P_{Rx,i}$ and $P_{Ix,j}$ denote the signal strength received by the i-th terminal device that needs signal coverage and the signal strength received by the j-th terminal device that needs to avoid interference, respectively, that is, the signal strength received by the communication node of first type and the signal strength received by the communication node of second type in the preceding embodiments, respectively; and $\overline{P_{Rx}}$ and $\overline{P_{Ix}}$ denote the average signal strength received by the $K_1$ terminal devices that need signal coverage and the average signal strength received by the $K_2$ terminal devices that need to avoid interference, respectively, that is, the average signal strength received by the communication nodes of first type and the average signal strength received by the communication nodes of second type in the preceding embodiments, respectively.

$$\overline{P_{Rx}(x)} = \frac{1}{K_1} \sum_{i=1}^{K_1} P_{Rx,i}(x), \qquad (2)$$

$$\overline{P_{Ix}(x)} = \frac{1}{K_2} \sum_{j=1}^{K_2} P_{Ix,j}(x)$$

$w_1$, $w_2$, $w_3$, and $w_4$ separately denote weights of items in the function, and x denotes the manipulation parameter to be optimized (for example, the amplitude or phase) on the intelligent metasurface. x is the optimization parameter to be manipulated in the preceding embodiments. According to the channel information obtained in S210, the received signal of each terminal device may be obtained and described below.

$$y = H_2 X H_1 s \qquad (3)$$

y is a vector with a dimension of $(K_1+K_2)*1$, and the modulus value of the element is the signal strength, that is, according to the modulus value of y, the signal strength $P_{Rx,i}$ of each terminal device that needs signal coverage and the signal strength $P_{Ix,j}$ of each terminal device that needs to avoid interference may be obtained. The sent signal s is a vector with a dimension of $N*1$, and $X=\text{diag}(x)$ is a diagonal square matrix with a dimension of $M*M$. In the case where the manipulation parameter is the phase, $x_i = e^{j\theta_i}$, indicating that the phase of the incident electromagnetic wave is changed by the i-th electromagnetic unit on the intelligent metasurface by $\theta_i$. In the case where the manipulation parameter is the amplitude, $x_i = A_i e^{j\theta_o}$, indicating that the amplitude of the incident electromagnetic wave is changed by the i-th electromagnetic unit on the intelligent metasurface by $A_i$, and at the same time, each electromagnetic unit has the same phase change for the incident electromagnetic wave. The complete preset target function is obtained by substituting function (2) and function (3) into function (1). To make the electromagnetic waves manipulated by the intelligent metasurface converge as many as possible to the beam coverage region and as few as possible to the beam suppression region, a x group needs to be found to minimize the preset target function $f(x)$.

In an embodiment, two methods for solving this optimization problem are provided: the genetic algorithm and the gradient descent algorithm.

(1) Solving x Using the Genetic Algorithm

Figure 5:
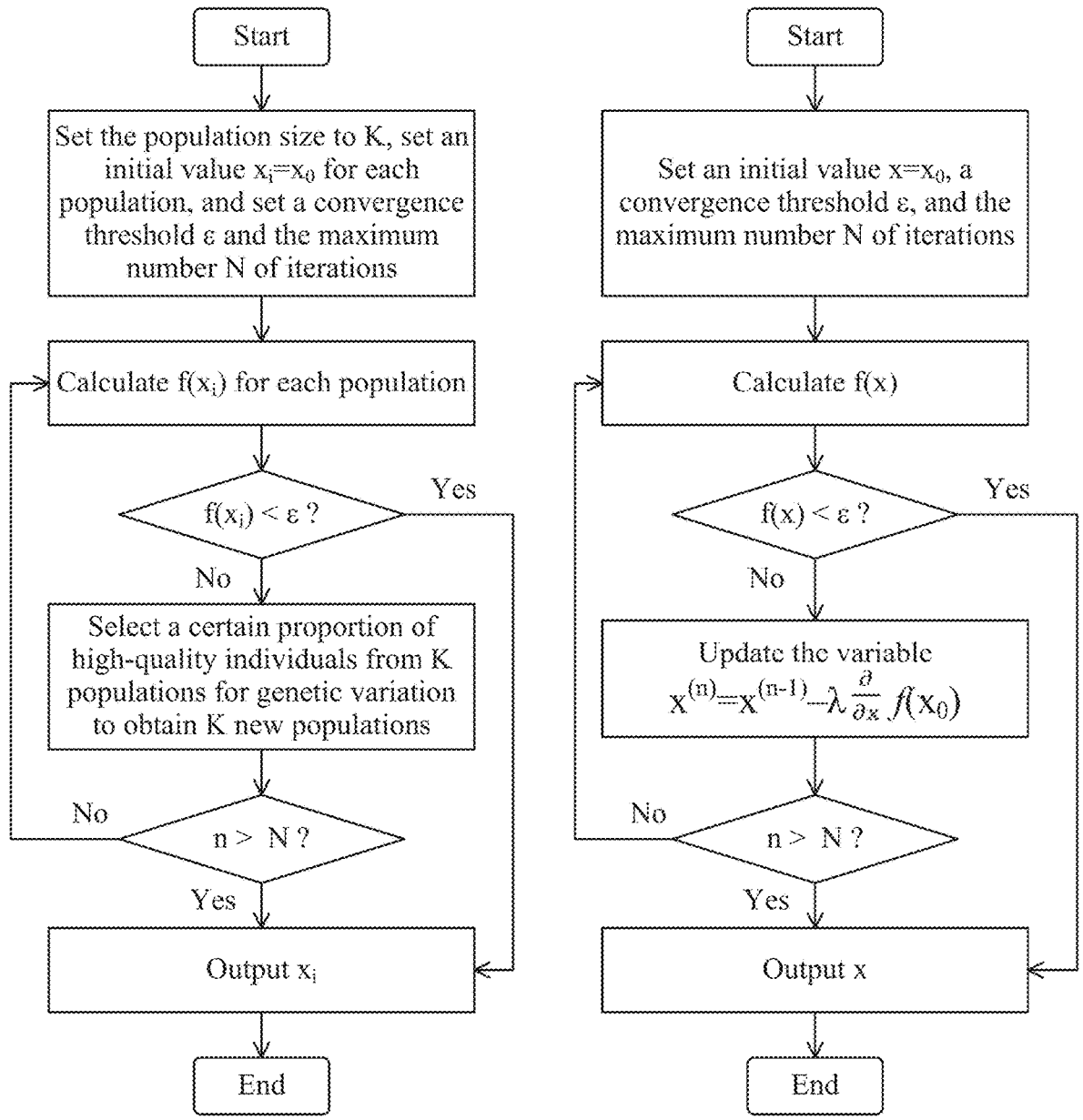
FIG. 5 is a flowchart showing the solution of a manipulation parameter to be optimized according to an embodiment of the present application.

The genetic algorithm is a method for searching for an optimal solution by simulating the natural evolutionary process. The solution process is converted into a process similar to the crossover and mutation of chromosomes in biological evolution so that an optimization result for a nonlinear optimization problem can usually be obtained more quickly. In the algorithm, the population size, an initial value of each individual, a convergence condition, and the maximum number of iterations need to be set, the optimal solution of the target function $f(x)$ is searched by iterative genetic variation, and in the case where one iteration result satisfies the convergence condition, the iteration result is determined as the final result and outputted. FIG. 5 is a flowchart showing the solution of a manipulation parameter to be optimized according to an embodiment of the present application. As shown in the flowchart (a) in FIG. 5, the population size is set to K, an initial value $x_i = x_0$ is set for each population, and a convergence threshold $\varepsilon$ and the maximum number N of iterations are set; $f(x_i)$ is calculated for each population; whether $f(x_i)$ is less than $\varepsilon$ is determined; if $f(x_i) < \varepsilon$, $x_i$ is outputted; if $f(x_i) \geq \varepsilon$, a certain proportion of high-quality individuals are selected from K populations for genetic variation, so as to obtain K new populations; whether the current number n of iterations is greater than N is determined; if $n > N$, $x_i$ is outputted; and if $n \leq N$, the step of calculating $f(x_i)$ for each population is performed again until $x_i$ is outputted.

(2) Solution Using the Gradient Descent Algorithm

In an embodiment, the gradient descent algorithm is another type of iteration-based nonlinear optimization algorithm. In the algorithm, a partial derivative of the preset target function $f(x)$ with respect to the variable x is used as a search direction, and the variable to be sought is iteratively updated so that the preset target function gradually converges to the minimum value. In the algorithm, an initial value of the variable to be sought, a convergence condition, and the maximum number of iterations are set, a partial derivative of the preset target function with respect to an independent variable is used as the search direction, the optimal solution is iteratively searched, and in the case where one iteration result satisfies the convergence condition, the iteration result is used as the final output. The detailed calculation process is shown in FIG. 5(b). As shown in the flowchart (a) in FIG. 5, an initial value $x=x_0$, a convergence threshold $\varepsilon$, and the maximum number N of iterations are set; $f(x)$ is calculated; whether $f(x)$ is less than $\varepsilon$ is determined; if $f(x)<\varepsilon$, x is outputted; if $f(x)\geq\varepsilon$, the variable $$x^{(n)} = x^{(n-1)} - \lambda \frac{\partial}{\partial x} f(x_0)$$

is updated; whether the current number n of iterations is greater than N is determined; if n>N, x is outputted; and if n≤N, the step of calculating $f(x)$ is performed again until x is outputted.

Since the solution of the optimization problem requires certain computing resources, in the case where the intelligent metasurface has limited computing resources or the cost of the intelligent metasurface needs to be reduced, the solution of the optimization problem may be transferred to the base station, the base station transmits a calculation result to the intelligent metasurface after completing the calculation, and then the intelligent metasurface implements the next operation. When the intelligent metasurface operates independently and is not connected to the base station, the solution of the optimization problem may be completed on other available servers, the calculation result is written to the system memory of the intelligent metasurface, and then the intelligent metasurface is triggered to proceed to the next operation.

In S230, the current manipulation state of the electromagnetic unit is adjusted according to the optimization parameter to be manipulated.

According to the result calculated in S220, the target manipulation state of each electromagnetic unit on the intelligent metasurface is determined, and according to the determined target manipulation state, the output level of the control circuit of the intelligent metasurface is adjusted and the state of the electronic component on the electromagnetic unit is adjusted, so as to adjust the overall manipulation state of the intelligent metasurface and finally achieving the beam manipulation target.

Figure 6:
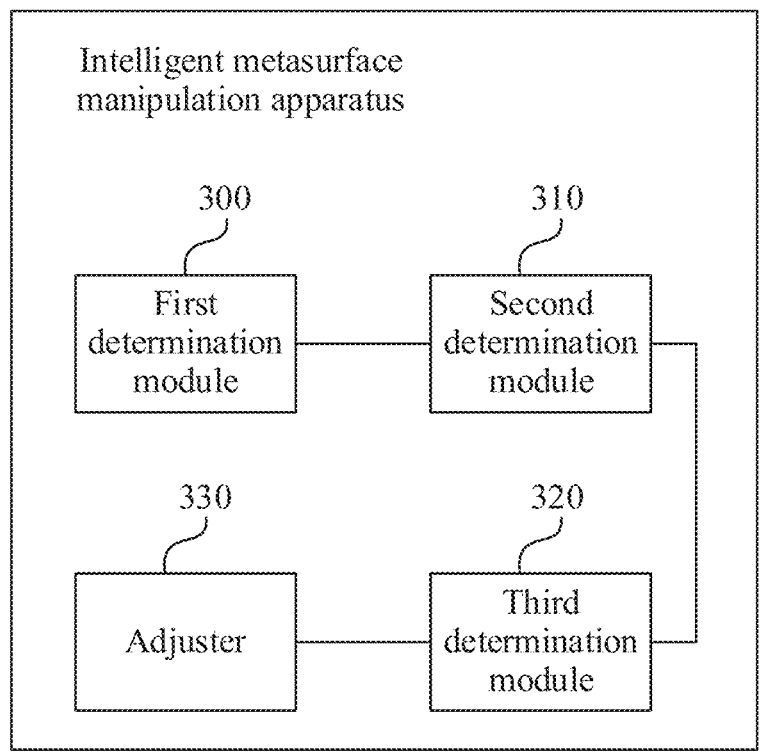
FIG. 6 is a block diagram of an intelligent metasurface manipulation apparatus according to an embodiment of the present application.

In an embodiment, FIG. 6 is a block diagram of an intelligent metasurface manipulation apparatus according to an embodiment of the present application. As shown in FIG. 6, this embodiment includes a first determination module 300, a second determination module 310, a third determination module 320, and an adjuster 330.

The first determination module 300 is configured to determine channel information and beam manipulation information. The second determination module 310 is configured to determine a manipulation parameter to be optimized in a preset target function according to the channel information and the beam manipulation information. The third determination module 320 is configured to determine a target manipulation state of each electromagnetic unit on an intelligent metasurface according to the manipulation parameter to be optimized. The adjuster 330 is configured to adjust a current state of the electromagnetic unit to the target manipulation state.

In an embodiment, the first determination module 300 includes one of a first determination unit or a receiving unit.

The first determination unit is configured to calculate the channel information and the position of the second communication node according to a received protocol message and determine the beam manipulation information according to the position of the second communication node. The receiving unit is configured to receive the channel information and the beam manipulation information sent by the first communication node or the second communication node.

In an embodiment, the channel information at least includes a channel matrix between the first communication node and the intelligent metasurface and a channel matrix between the intelligent metasurface and the second communication node.

In an embodiment, the beam manipulation information at least includes information about the beam coverage region, where the beam coverage region is a region where the wireless electromagnetic signal needs to be enhanced, at least one beam coverage region exists, and the beam coverage region is a point or a geometric area in space.

In an embodiment, the beam manipulation information further includes information about a beam suppression region, where the beam suppression region is a region where the wireless electromagnetic signal needs to be weakened, and the beam suppression region is a point or a geometric area in space.

In an embodiment, the beam manipulation information is determined by the positions of all the communication nodes of first type and the positions of all the communication nodes of second type, where the communication node of first type is the second communication node that the intelligent metasurface needs to serve, the communication node of second type is the second communication node with which the intelligent metasurface needs to be prevented from interfering, the positions of the communication nodes of first type form the beam coverage region, and the positions of the communication nodes of second type form the beam suppression regions.

In an embodiment, a manner of determining the number of the communication nodes of first type, the number of the communication nodes of second type, the positions of the communication nodes of first type, and the positions of the communication nodes of second type includes one of the following: pre-configured or real-time measurement.

In an embodiment, the preset target function is determined by the signal strength received by the communication node of first type, the signal strength received by the communication node of second type, the average signal strength received by the communication nodes of first type, and the average signal strength received by the communication nodes of second type.

In an embodiment, the manipulation parameter to be optimized in the preset target function is determined using a genetic algorithm or a gradient descent algorithm.

In an embodiment, the intelligent metasurface is formed by an electromagnetic unit array, where the electromagnetic unit array is formed by the same or different types of electromagnetic units and includes one of the following: a planar array or a curved array.

In an embodiment, the electromagnetic unit is made of one of the following materials: metal, dielectric material, or liquid crystal material; the dimension of the electromagnetic unit has a sub-wavelength magnitude; the electromagnetic unit is configured to manipulate an electromagnetic wave impinging to the surface of the electromagnetic unit; an electromagnetic property to be manipulated on the electromagnetic unit includes one of the following: electromagnetic wave amplitude, a phase, or a polarization direction; and the electromagnetic unit includes one of the following adjustable electronic components: resistors, capacitors, diodes, varactor diodes, or triodes.

The intelligent metasurface manipulation apparatus provided in this embodiment is configured to perform the intelligent metasurface manipulation method in the embodiment shown in FIG. 3. The intelligent metasurface manipulation apparatus provided in this embodiment has similar implementation principles and technical effects which are not repeated here.

Figure 7:
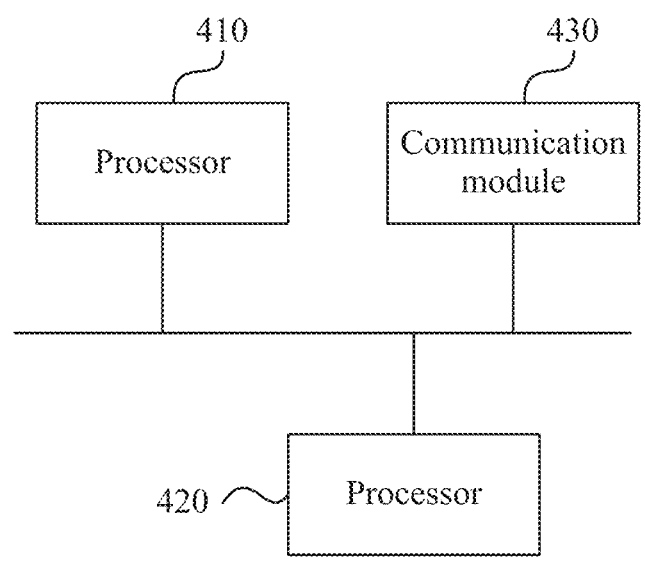
FIG. 7 is a structural diagram of an intelligent metasurface according to an embodiment of the present application.

FIG. 7 is a structural diagram of an intelligent metasurface according to an embodiment of the present application. As shown in FIG. 7, the intelligent metasurface provided in the present application includes a processor 410, a memory 420, and a communication module 430. One or more processors 410 may be provided in the intelligent metasurface. FIG. 7 shows one processor 410 as an example. One or more processors 420 may be provided in the intelligent metasurface. FIG. 7 shows one processor 420 as an example. The processor 410, the memory 420, and the communication module 430 in the intelligent metasurface may be connected by a bus or in other manners. FIG. 7 shows a connection by the bus as an example. As a computer-readable storage medium, the memory 420 of the intelligent metasurface may be configured to store software programs, computer-executable programs, and modules, such as program instructions/modules (for example, the first determination module 300, the second determination module 310, the third determination module 320, and the adjuster 330 in the intelligent metasurface manipulation apparatus) corresponding to the intelligent metasurface according to any embodiment of the present application. The memory 420 may include a program storage region and a data storage region, where the program storage region may store an operating system and an application program required by at least one function, and the data storage region may store data created depending on the use of the intelligent metasurface. Additionally, the memory 420 may include a high-speed random-access memory and may further include a non-volatile memory, for example, at least one magnetic disk memory, a flash memory, or another non-volatile solid-state memory. In some examples, the memory 420 may include memories which are remotely disposed relative to the processor 410, and these remote memories may be connected to the intelligent metasurface via a network. Examples of the preceding network include, but are not limited to, the Internet, an intranet, a local area network, a mobile communication network, and a combination thereof.

The communication module 430 is configured to perform communication interaction between a first communication node and a second communication node.

The intelligent metasurface provided above may be configured to perform the intelligent metasurface manipulation method provided by any embodiment described above and has corresponding functions and effects.

Figure 8:
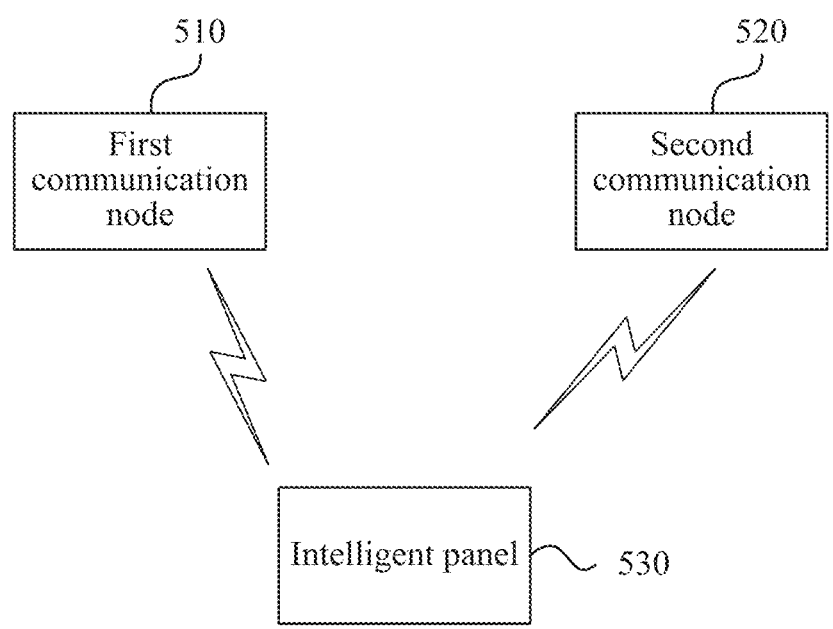
FIG. 8 is a block diagram of an intelligent metasurface manipulation system according to an embodiment of the present application.

In an embodiment, FIG. 8 is a block diagram of an intelligent metasurface manipulation system according to an embodiment of the present application. The intelligent metasurface manipulation system in this embodiment at least includes one first communication node 510, at least one second communication node 520, and at least one intelligent metasurface 530; where the first communication node 510 communicates with the intelligent metasurface 530 in a wired manner or a wireless manner, the second communication node 520 communicates with the intelligent metasurface 530 in the wireless manner, one first communication node 510, one intelligent metasurface 530, and the at least one second communication node 520 form one beam optimization manipulation group, and the beam optimization manipulation group is configured to optimize, regulate, and control a wireless electromagnetic wave according to the intelligent metasurface manipulation method in any one of the preceding embodiments. As shown in FIG. 8, the case where the intelligent metasurface manipulation system includes one first communication node 510, one second communication node 520, and one intelligent metasurface 530 communicating with each other in the wireless manner is used as an example for the description of the structure of the intelligent metasurface manipulation system. In an embodiment, the first communication node 510 communicates with the intelligent metasurface 530 in the wireless manner, and the second communication node 520 communicates with the intelligent metasurface 530 in the wireless manner.

An embodiment of the present application further provides a storage medium including computer-executable instructions which, when executed by a computer processor, cause the computer processor to perform the intelligent metasurface manipulation method. The method includes determining channel information and beam manipulation information; determining a manipulation parameter to be optimized in a preset target function according to the channel information and the beam manipulation information; determining a target manipulation state of each electromagnetic unit on an intelligent metasurface according to the manipulation parameter to be optimized; and adjusting a current state of the electromagnetic unit to the target manipulation state.

It is to be understood by those skilled in the art that the term "user equipment" covers any suitable type of wireless user equipment, for example, a mobile phone, a portable data processing device, a portable web browser, or a vehicle-mounted mobile station.

Generally speaking, various embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing device, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored in the memory. The memory may be of any type suitable for a local technical environment and may be implemented using any suitable data storage technology such as, but not limited to, a read-only memory (ROM), a random-access memory (RAM), or an optical memory device and system (a digital video disc (DVD) or a compact disc (CD)). Computer-readable media may include non-transitory storage media. The data processor may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. An intelligent metasurface manipulation method, comprising:
   determining channel information and beam manipulation information;
   determining a manipulation parameter to be optimized in a preset target function according to the channel information and the beam manipulation information;
   determining a target manipulation state of each electromagnetic unit on an intelligent metasurface according to the manipulation parameter to be optimized; and
   adjusting a current state of each electromagnetic unit to the target manipulation state.

2. The method of claim 1, wherein determining the channel information and the beam manipulation information comprises:
   receiving the channel information and the beam manipulation information sent by a first communication node or a second communication node.

3. The method of claim 1, wherein the channel information at least comprises a channel matrix between a first communication node and the intelligent metasurface and a channel matrix between the intelligent metasurface and a second communication node.

4. The method of claim 1, wherein the beam manipulation information at least comprises information about a beam coverage region, wherein the beam coverage region is a region where a wireless electromagnetic signal needs to be enhanced, at least one beam coverage region exists, and the beam coverage region is a point or a geometric area in space.

5. The method of claim 4, wherein the beam manipulation information further comprises information about a beam suppression region, wherein the beam suppression region is a region where the wireless electromagnetic signal needs to be weakened, and the beam suppression region is a point or a geometric area in space.

6. The method of claim 1, wherein the beam manipulation information is determined by positions of all communication nodes of first type and positions of all communication nodes of second type, wherein each of the all communication nodes of first type is a second communication node that the intelligent metasurface needs to serve, each of the all communication nodes of second type is a second communication node with which the intelligent metasurface needs to be prevented from interfering, the positions of the all communication nodes of first type form beam coverage regions, and the positions of the all communication nodes of second type form beam suppression regions.

7. The method of claim 6, wherein a manner of determining the number of the communication nodes of first type, the number of the communication nodes of second type, the positions of the communication nodes of first type, and the positions of the communication nodes of second type comprises pre-configured.

8. The method of claim 1, wherein the preset target function is determined by signal strength received by a communication node of first type, signal strength received by a communication node of second type, average signal strength received by communication node of first types, and average signal strength received by communication node of second types.

9. The method of claim 1, wherein the manipulation parameter to be optimized in the preset target function is determined using a genetic algorithm or a gradient descent algorithm.

10. The method of claim 1, wherein the intelligent metasurface is formed by an electromagnetic unit array, wherein the electromagnetic unit array is formed by the same or different types of electromagnetic units and comprises a planar array.

11. The method of claim 1, wherein the electromagnetic unit is made of one of the following materials: metal, dielectric material, or liquid crystal material;
   wherein a size of the electromagnetic unit is of sub-wavelength, and the electromagnetic unit is configured to manipulate an electromagnetic wave impinging to a surface of the electromagnetic unit.

12. An intelligent metasurface manipulation apparatus, comprising:
   at least one processor; and
   a memory communicatively connected to the at least one processor;
   wherein the memory stores instructions executable by the at least one processor to cause the at least one processor to perform an intelligent panel regulation and control method, wherein the intelligent panel regulation and control method comprises:
   determining channel information and beam manipulation information;
   determining a manipulation parameter to be optimized in a preset target function according to the channel information and the beam manipulation information;
   determining a target manipulation state of each electromagnetic unit on an intelligent metasurface according to the manipulation parameter to be optimized; and
   adjusting a current state of each electromagnetic unit to the target manipulation state.

13. An intelligent metasurface, comprising a communication module, a memory, and at least one processor;
   wherein the communication module is configured to perform communication interaction with a first communication node and a second communication node;
   the memory is configured to store at least one program; and
   the at least one program, when executed by the at least one processor, causes the at least one processor to perform the intelligent metasurface manipulation method of claim 1.

14. An intelligent metasurface manipulation system, comprising at least one first communication node, at least one second communication node, and at least one intelligent metasurface; wherein the first communication node communicates with the intelligent metasurface in a wired manner or a wireless manner, the at least one second communication node communicates with the intelligent metasurface in the wireless manner, one first communication node, one intelligent metasurface, and the at least one second communication node forms one beam optimization manipulation group, and the beam optimization manipulation group is configured to optimize, regulate, and control a wireless electromagnetic wave according to the intelligent metasurface manipulation method of claim 1.

15. A non-transitory storage medium storing a computer program, wherein the computer program, when executed by a processor, causes the processor to perform an intelligent panel regulation and control method, wherein the intelligent panel regulation and control method comprises:

determining channel information and beam manipulation information;

determining a manipulation parameter to be optimized in a preset target function according to the channel information and the beam manipulation information;

determining a target manipulation state of each electromagnetic unit on an intelligent metasurface according to the manipulation parameter to be optimized; and adjusting a current state of each electromagnetic unit to the target manipulation state.

16. The method of claim 1, wherein determining the channel information and the beam manipulation information comprises:

calculating the channel information and a position of a second communication node according to a received protocol message and determining the beam manipulation information according to the position of the second communication node.

17. The method of claim 6, wherein a manner of determining the number of the communication nodes of first type, the number of the communication nodes of second type, the positions of the communication nodes of first type, and the positions of the communication nodes of second type comprises: real-time measurement.

18. The method of claim 1, wherein the intelligent metasurface is formed by an electromagnetic unit array, wherein the electromagnetic unit array is formed by the same or different types of electromagnetic units and comprises a curved array.

19. The method of claim 1, wherein an electromagnetic property to be manipulated on the electromagnetic unit comprises one of the following: electromagnetic wave amplitude, phase, or polarization direction.

20. The method of claim 1, wherein the electromagnetic unit comprises one of the following adjustable electronic components: resistors, capacitors, diodes, varactor diodes, or triodes.

* * * * *